United States Patent [19]

Haentjens

[11] 4,037,980
[45] July 26, 1977

[54] PUMP COUPLING

[76] Inventor: Walter D. Haentjens, Box 121, R.D. No. 1, Sugarloaf, Pa. 18249

[21] Appl. No.: 644,300

[22] Filed: Dec. 24, 1975

[51] Int. Cl.² .................................. F16B 1/00
[52] U.S. Cl. .................................. 403/336; 403/320; 403/316; 64/6; 151/57
[58] Field of Search ............... 64/6; 151/57; 403/316, 403/230, 315, 337, 320, 336; 85/1

[56] References Cited

U.S. PATENT DOCUMENTS

| | | | |
|---|---|---|---|
| 1,393,261 | 10/1921 | Casey | 151/57 |
| 2,446,846 | 8/1948 | Noble | 403/316 |
| 2,758,897 | 8/1956 | Naab | 403/316 |
| 3,468,572 | 9/1969 | Haentjens | 403/337 |

Primary Examiner—Samuel Scott
Assistant Examiner—Randall Heald
Attorney, Agent, or Firm—Hill, Gross, Simpson, Van Santen, Steadman, Chiara & Simpson

[57] ABSTRACT

Locking device locking the suspension nut of a driven shaft from rotation relative to the shaft, upon reversal in the direction of rotation of the shaft or such vibration as would loosen an ordinary nut. The locking device is particularly adapted for cantilevered shaft vertical pumps in which the shaft and pump impeller on the end of the shaft are susceptible to vibration. The locking device includes a pump coupling including a motor shaft coupling part and a pump shaft coupling part detachably secured to the motor shaft coupling part. A nut part having a cylindrical periphery is threaded on the pump shaft and recessed within the pump shaft coupling part, to suspend the shaft from the pump shaft coupling part. The full weight of the pump shaft, coupling and impeller, including the hydraulic thrust, is borne by the threaded connection between the pump shaft and the coupling nut. The coupling nut is tightened by a spanner wrench having projections fitting into drilled holes in the coupling nut. The pump shaft coupling part has a cylindrical inner periphery and an odd number of half holes opening to the periphery thereof. The nut has an even number of half holes opening to its periphery and so arranged that an aligned number of half holes may be formed by 1/72 of a revolution of one part relative to the other. A locking pin fits in the aligned holes and is of sufficient diameter to take the full torque load on the pump shaft and serves as a locking pin rather than a shear pin. The locking pin has a threaded hole in one end and can be removed by the insertion of a puller bolt in the threaded hole.

6 Claims, 7 Drawing Figures

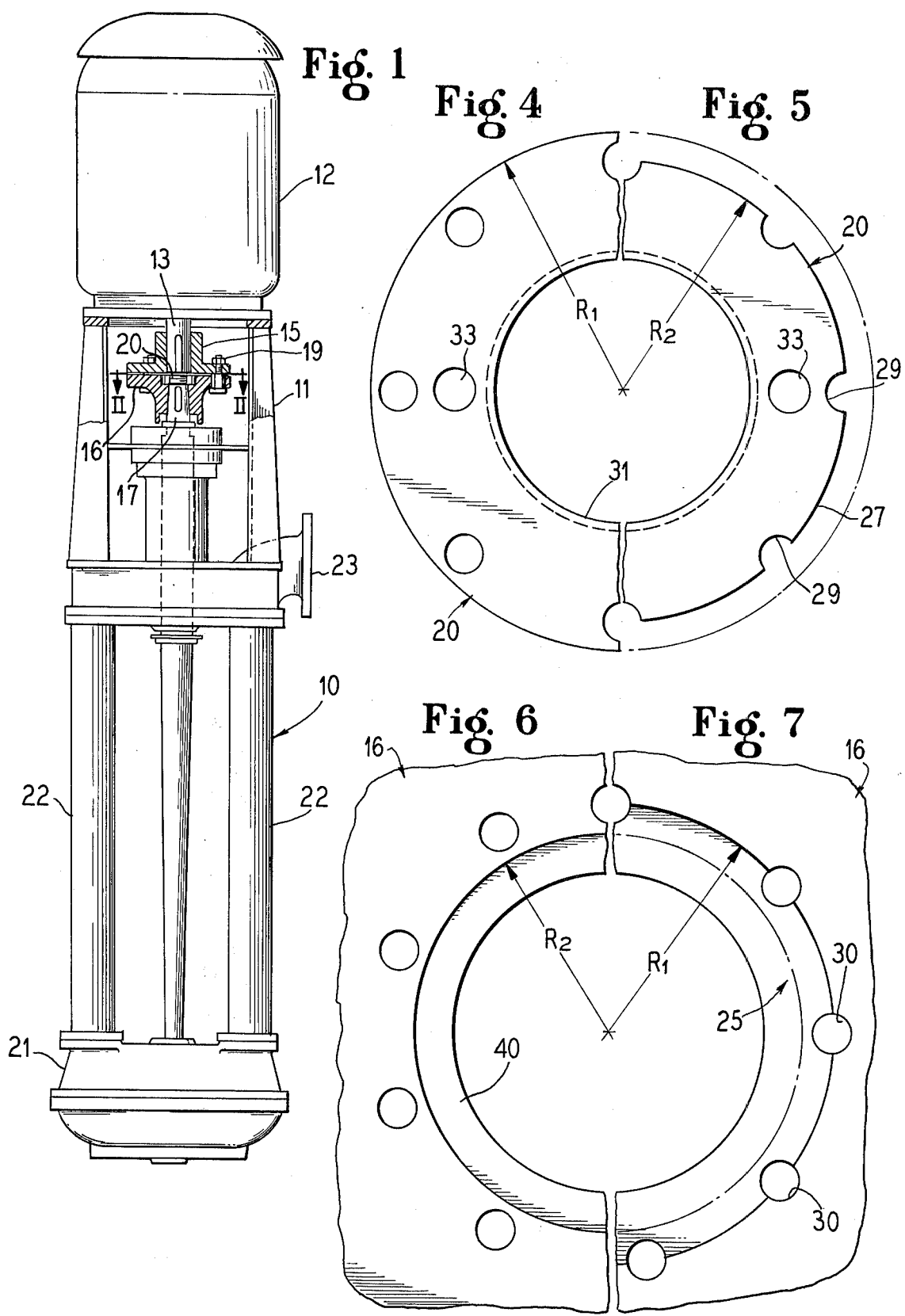

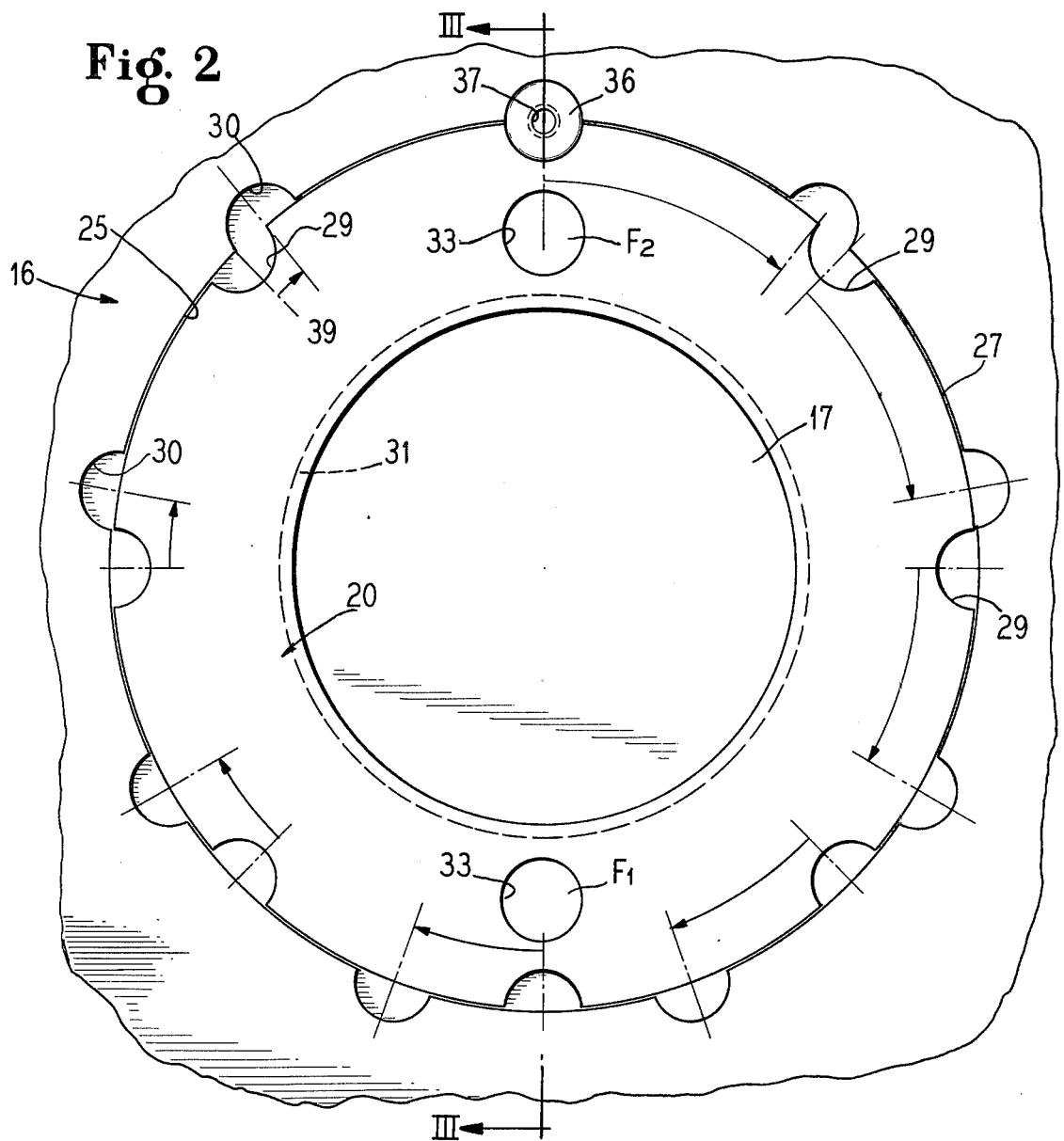
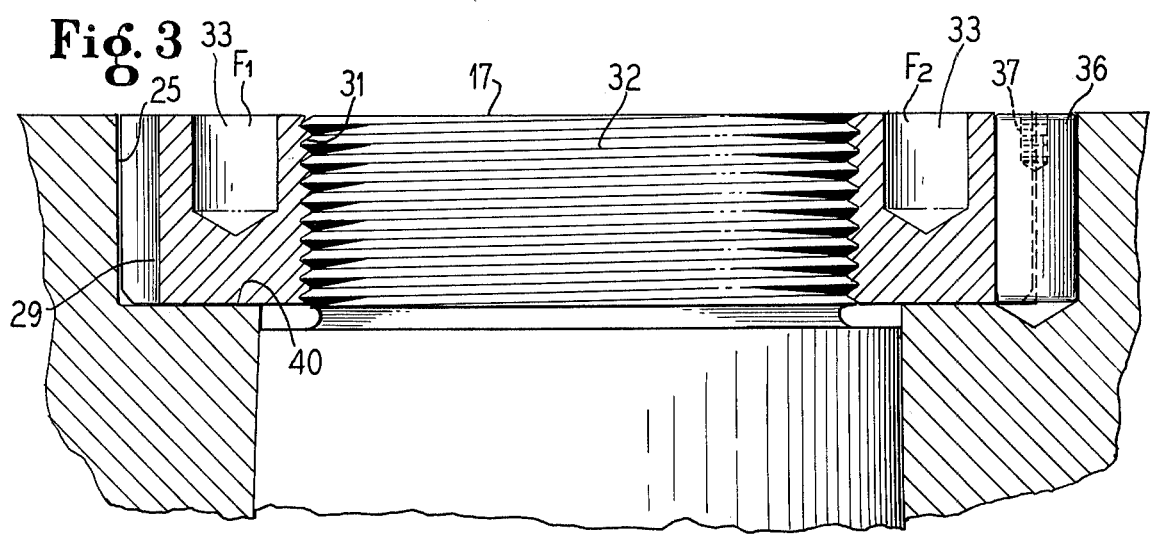

4,037,980

PUMP COUPLING

FIELD OF THE INVENTION

Pump coupling for vertical pumps locking the pump shaft to its suspension nut, such as found in Classes 70/181, 183, 184, 185, 186, 187, 85/1, 151/54, 57 and 403/315,316.

PRIOR ART, SUMMARY AND ADVANTAGES OF INVENTION

The Patent to Noble U.S. Pat. No. 2,446,846 discloses a joint construction and method of making the construction to provide semi-cylindrical holes. The semi-cylindrical holes in one part are threaded while the cylindrical holes in the other part are plain. This greatly increases the manufacturing cost of the device, requiring threading operations of the half holes in one part and extra stock to permit drilling, tapping and counterboring and then remachining of the parts to fit the parts together can cut away half of each hole.

The Patents to Pierson U.S. Pat. No. 305,843, Richards U.S. Pat. No. 902,169, Pemberton U.S. Pat. No. 1,035,041, Swope U.S. Pat. No. 1,599,068, Goetz et al U.S. Pat. No. 1,791,758, Kilpela U.S. Pat. No. 1,940,455 and Morris U.S. Pat. No. 2,419,849 are also of interest.

The present invention improves upon the prior art references just mentioned in that the threading of the half holes of one part is eliminated and the holes of each part are plain. The two parts are locked by the insertion of the locking pin in a matching pair or half holes resulting in a material simplification in the coupling and locking means therefor, locking a cantilevered shaft and its impeller to be suspended from the pump shaft coupling.

An advantage of the invention, therefore, is in the positiveness of the locking means preventing a coupling nut for a pump shaft from unscrewing upon reversal in the direction of rotation of the pump or upon such vibration as would loosen an ordinary nut.

A further advantage of the invention is in the simplicity and positiveness of the locking means for a cantilever pump shaft and its adaptation to vertical pumps in which the impeller is on the lower end of a relatively long, heavy pump shaft and depends solely on the holding of the coupling nut.

A further advantage is that the full weight of the cantilevered pump shaft, coupling, impeller and any hydraulic thrust may be borne by a single threaded connection between the pump shaft and coupling nut.

A further advantage of the invention is the provision of an improved pump shaft locking means utilizing half holes opening to the periphery of the coupling nut and other half holes opening to the inner periphery of the pump shaft coupling part so arranged that one pair of half hooks may be aligned by 1/72 of a revolution of one part relative to the other to receive a locking pin.

A still further advantage of the invention is that the coupling nut having an even number of holes opening to the periphery thereof and the pump shaft coupling part having an odd number of half holes opening to the periphery thereof when tightened by the use of a spanner wrench, may be locked in position by the registry of one pair of half holes and the insertion of a locking pin therein.

A still further advantge of the invention is that the provision of half holes opening to the inner periphery of the coupling part having a coupling nut recessed therein, which are so arranged that the nut may be locked to the coupling part by the insertion of a coupling pin in a pair of registering holes and one pair of half holes may be brought into registry upon the turning of the coupling part relative to the nut a relatively short part of a revolution.

Other objects, features and advantages of the invention will be readily apparent from the following description of a preferred embodiment thereof, taken in conjunction with the accompnying drawings, although variations and modifications may be effected without departing from the spirit and scope of the novel concepts of the disclosure.

DESCRIPTION OF THE DRAWINGS

FIG. 1 is a view in side elevation of a vertical pump constructed in accordance with the principles of the present invention;

FIG. 2 is a partial fragmentary top plan view of the pump shaft coupling part and nut with the motor shaft coupling part removed, and showing the nut locked to the motor shaft coupling part after threading on the motor shaft;

FIG. 3 is a transverse sectional view tken substantially along line III—III of FIG. 2;

FIG. 4 is a plan view of one half of the nut part prior to machining of the part to form half holes therein;

FIG. 5 is a top plan view of half of the nut part showing the nut part machined to form the half holes;

FIG. 6 is a top plan view of the coupling part showing one half thereof prior to machining to form the half holes therein; and FIG. 7 is a fragmentary plan view of one half of the coupling part llustrating the machining operations necessary to form half holes therein.

DESCRIPTION OF PREFERRED EMBODIMENT OF INVENTION

In FIG. 1 of the drawings, I have shown a vertical pump 10 having a frame 11 having a motor 12 mounted on the top of said frame and projecting upwardly therefrom. The motor 12 has a depending motor shaft 13 having a driving shaft coupling part 15 keyed or otherwise secured thereto and abutting a driven shaft coupling part 16, shown as being keyed or otherwise secured to the upper end of a depending pump shaft 17. The coupling parts 15 and 16 are secured together by a plurality of coupling nuts and bolts 19 in a conventional manner. A nut part 20 is recessed within the pump shaft coupling part 16 and threaded on the upper end of the pump shaft 17 and serves to suspend the pump shaft and impeller (not shown) on the lower end thereof, and to take the full weight of the shaft 17, coupling part 16 and impeller (not shown) in addition to any hydraulic thrust borne by the threaded connection between the shaft and the couplin nut part.

It should be understood that in a pump of the type described in which a cantilever shaft has an impeller on its lower end and is relatively long, the shaft itself is extremely heavy and the shaft and impeller depend solely on the holding of the coupling nut.

The pump itself is well-known to those skilled in the art and may be a "Hazleton" type "VN-2" pump or may be of a type shown and described in my prior U.S. Pat. No. 3,468,572, dated Sept. 23, 1969 and incorporated herein as a type of pump to which my invention may be applied as an improvement in the pump coupling and support and locking means for the cantilevered pump shaft and impeller on its lower end.

The inlet to the pump is through a casing 21 suspended from connecting pipes 22 leading upwardly to an outlet 23. A strainer (not shown) is provided in the inlet through the casing 21, and the connecting or suspension pipes 22 each have communication with the outlet 23 at their upper ends, in a manner well-known to those skilled in the art, so not herein shown or described further.

Referring now in particular to the details of construction of the shaft coupling, and certain novel features of the invention, the coupling part 16 is a flanged coupling part, shown in FIG. 1 as being keyed to the tapered upper end of the shaft 17. Said coupling part 16 has a central recessed portion 25 concentric with the center of the shaft 17 and having a cylindrical inner periphery forming a shouldered recess of the depth of the thickness of the nut, within which fits the coupling nut 20. Said coupling nut also has a cylindrical outer periphery 27 having a series of uniformly spaced half holes 29 formed therein, and opening to the outer periphery of the coupling nut and the inner periphery 25 of the recessed portion of the coupling part 16. The recessed portion 25 of the coupling part 16 also has a plurality of half holes 30 therein opening to the cylindrical inner periphery 25 of said coupling part and uniformly spaced. As shown in FIG. 2, there are an even number of half holes opening to the outer periphery of the coupling nut 20 and an odd number of half holes opening to the internal cylindrical wall of the recessed portion 25 of the coupling part 16. This arrangement need not necessarily be adhered to and the half holes in the nut may be an odd number, while the half holes in the coupling part may be of an even number.

The nut 20 is shown as having an internal threaded portion 31 threaded on a threaded portion 32 of the upper end portion of the shaft 17 and has a pair of diametrically spaced holes 33 therein opening to the top thereof to receive the projection of a spanner wrench (not shown), which may fit into said drilled holes to tighten the coupling nut to the desired torque limit.

In order to have a single hole made from the two half holes 30 and 29 with a minimum amount of rotation of the coupling part 16 relative to the nut 20, the nut 20 may be tightened on the shaft 17 until two half holes 30 and 29 register. The spacing shown in FIG. 2 of the drawings is such that only 1/72 of a revolution is required to find an aligning pair of half holes. A locking pin 36 is then inserted in the aligned pair of half holes.

The size and type of threads 31 and 32 and the length of thread engagement are calculated to support the relatively heavy pump impeller shaft 17 and the half holes 29 and 30 are sized to receive the locking pin 36 and thereby lock the nut 20 to the coupling part 16 and serve as a locking pin rather than a shear pin.

The locking pin 36 has a drilled hole 37 opening to its top and threaded to accommodate removal of the locking pin by inserting a puller bolt in the threaded portion 37.

In the present invention, as shown in FIG. 2, the distance required to register a pair of holes 29 and 30 is 1/72 of a revolution, as indicated by the circumferential distance between the centers of the holes by reference numberal 39. This distance, however, may be varied one way or another. The spacing of the half holes 29 and 30 is shown as increasing in a clockwise direction from the pin 36 and where the half holes 30 and 29 may be registered with 1/72 of a revolution for the first set of half holes in a clockwise direction from the pin 36, this spacing gradually decreases until the half holes next adjacent the pin 36 in a counterclockwise direction is the same as the spacing of the first half holes in a clockwise direction, making it possible to readily register two half holes with minimum amount of turning movement of the nut relative to the coupling part 16, should the locking pin 36 be removed and it should be desired to tighten or loosen the nut 20.

FIGS. 4, 5 6 and 7 illustrate one method of manufacture of the coupling nut and coupling part 16 to provide the desired half holes opening to the outer periphery of the nut and the inner periphery of the cylindrical wall of the recessed portion of the coupling part.

In manufacturing the couplng nut, the nut first has a periphery having a radius R1. Full holes of the required size are then drilled in the coupling nut and it is machined to a radius R2 giving a cylindrical outer peripheral coupling nut with uniformly spaced half holes opening to the periphery thereof.

The coupling part is machined to an internal bore of a radius R2 down to a shouldered portion 40 thereof. The half holes are then drilled into the coupling part to the desired depth. The coupling is then machined to a radius R1 which is similar to the external radius of the nut as shown in FIG. 5, with sufficient clearance to accommodate the turning of one part relative to the other, giving an odd number of half holes in the coupling part registrable with one half hole in the nut upon 1/72 of a revolution of the nut relative to the coupling part. The shouldered portion 40 during the machining operation extends to the half holes, as shown in FIG. 2.

It may be seen from the foregoing that I have provided a simplified form of coupling in which a coupling nut supporting the impeller shaft on the coupling is locked in position by registry of a half hole in the outer periphery of a coupling nut with a half hole opening to the inner perihery of the coupling part and by the insertion of a locking pin having a cross sectional area sufficient to withstand the full torque load of the pump and thereby serve as a locking pin to prevent the coupling nut from becoming unscrewed on the pump shaft upon reverse direction of the motor or excessive vibration of the pump shaft.

I claim as my invention:

1. A coupling assembly comprising:
   a power input shaft and a coaxial power output shaft with opposed respective ends,
   one of said shafts having a circumferential terminal threaded end,
   first coupling means positionable on the end of said one shaft,
   a nut-receiving recess defined in the forward face of said first coupling means, said recess having said wall portions located generally in radially equally spaced relationship to the axis of said shafts, in the region of said terminal threaded end,
   a cylindrical coupling nut having an axial bore provided with complimentary threads, said coupling nut engaging said terminal threaded end and being receivable within said recess with the outside radius of said coupling nut approaching the radius of said recess,
   said recess additionally having a first plurality of half holes defined at circumferentially equally spaced intervals in said side wall portions, the axis of each such half hold being generally parallel to the axes of the other thereof, and also being equally radially spaced from said shaft axis, said coupling nut additionally having a second plurality of half holes defined at circumferentially equally spaced intervals in the cylindrical outer wall thereof, the axis of each such half hole being generally parallel to the axes of the others thereof and also being equally radially spaced from said shaft axis, the radius of each half hole in said first plurality of half holes being generally equal to the radius of each half hole in said second plurlity of half holes, one of said pluralities of half holes comprising an even number of half holes, the other of said pluralities of half holes comprising an odd number of half holes whereby a minimum amount of turning of said coupling nut relative to said one shaft when one end face of said coupling nut is engaged with bottom facial portion of said recess is required to align one half hole of said first plurality of half holes with one half hole of said second plurality of half holes thereby to define a cylindrical channel, comprised of two registering half holes, locking pin means slidably mounting in said channel, second coupling means engaged with the other of said shafts at such opposed end thereof, including shaft engaging means therefor, said second coupling means having a forward face in abutting and mating relationship with said forward face of said first coupling means, and overlying said locking pin means, and retaining means holding said first coupling means in rigid engagement with said second coupling means.

2. The coupling assembly of claim 1 wherein said second plurality of half holes comprises an even number of half holes and said first plurality of half holes comprises an odd number of half holes.

3. The coupling assembly of claim 1 wherein the number of half holes in each one of said pluralities of half holes are so spaced relative to one another that not more than about 1/72 of a revolution of said coupling nut relative to said first coupling means is required to align one half hole of said first plurality of half holes with one half hole of said second plurality of half holes.

4. The coupling assembly of claim 1 wherein said power input shaft and said coaxial power output shaft each have a vertical axis, said power input shaft comprises a motor shaft, and said power output shaft has an impeller at its lower end.

5. The coupling assembly of claim 1 wherein said coupling nut has spanner holes therein to accommodate tightening thereof by a spanner wrench, and wherein said pluralities of half holes are so constructed that not more than about 1/72 of a revolution of said coupling nut is necessary to align a pair or half holes to define a channel.

6. The coupling assembly of claim 5 wherein said locking pin means has an internally threaded end to accommodate removal thereof by a puller bolt and has sufficient cross sectional area to withstand anticipated full torque loads on said power output shaft and is adapted to lock said power output shaft from unscrewing should said power input shaft and said power output shaft turn in a reverse direction or be subjected to vibration sufficient to loosen said coupling nut.

* * * * *